Jan. 20, 1953 E. ADLER ET AL 2,626,206

METHOD OF MAKING CIRCUIT PANEL

Filed Sept. 10, 1951

INVENTOR.
Edward Adler
BY Anthony Chiesa
David Mosey
ATTORNEY

Patented Jan. 20, 1953 2,626,206

UNITED STATES PATENT OFFICE 2,626,206

METHOD OF MAKING CIRCUIT PANELS

Edward Adler, New York, and Anthony Chiesa, Flushing, N. Y., assignors to Etched Products Corporation, Long Island City, N. Y., a corporation of New York Application September 10, 1951, Serial No. 245,872

11 Claims. (Cl. 41—42)

This invention relates to electric circuit panels, generally known as "printed" circuit panels, and more particularly to a novel printed circuit panel in which the circuit or conductive elements are flush with the surface of the dielectric panel.

These circuit panels have found extensive use in electronic devices such as radios, television sets, radar equipment, and business machines utilizing electronic components. In the completed form, the panels comprise a flat piece of dielectric material on one or both surfaces of which are strips and other configurations of metal or metallic foil arranged in a predetermined pattern to provide circuit connections between devices operatively associated with or mounted on the panel. The panel may have apertures for the reception and mounting of movable contact elements cooperable with the metal circuit elements.

These panels may be constructed in several different ways, as by die cutting a copper or brass sheet to the desired circuit pattern and adhering the cut pattern to a surface of the dielectric panel. A more satisfactory arrangement is to adhere a sheet or foil of copper or the like to a surface of the dielectric panel, imprinting the circuit pattern on the metal sheet with an etch-acid-resisting ink or with a tacky ink which is then sprinkled with etch-acid-resist powder, dipping the panel in an etching solution to remove all except the printed portion of the metal surface, and then removing the ink and powder from the remaining metal pattern.

In either method of forming the panel, the conductive surfaces extend slightly beyond the dielectric surface. This is disadvantageous, particularly where wiping contacts are associated with the printed circuits. The extended surfaces form shoulders with the dielectric surface, and these shoulders frequently are snagged either in assembly of the electronic device or by wiping contacts. Such snagging may result in pulling away of the circuit elements from the dielectric panel.

To overcome these difficulties, it has been proposed to fill the spaces between the circuit elements with an insulating filler, such as an insulating paint. This filler is then wiped off flush with the conductor surfaces, and the panel is baked or similarly treated to harden the filler. While this expedient has been helpful in eliminating such snagging, the filler sometimes is chipped or cracked in assembly or use of the panel, thereby destroying the continuity of the flush outer surface.

In accordance with the present invention, a printed circuit panel, having one or both printed surfaces of a flush nature, is provided in a novel manner. To this end, the sheet of metal or metallic foil is adhered to the surface of a partially or semi-cured panel of a thermo-setting synthetic resin. In the partially or semi-cured state, such resins are deformable, but may be hardened or cured by the application of heat and pressure.

A preferred dielectric material may be a phenol condensation insulating material, such as "Bakelite" or other suitable insulating material. The material used is such that it may be formed into pliable or deformable semi-cured sheets which may be subsequently cured and hardened.

The metal or metallic foil sheet is adhesively secured at its rear to a surface of a semi-cured panel of the material, and the panel is then printed and etched in the manner described above. After removal of the ink and any resist powder from the printed circuit components, the panel is subjected to heat and pressure. This forces the conductive surfaces into flush relation with the dielectric while the latter is simultaneously cured and hardened. The resultant panel has completely flush surfaces whose continuity can be interrupted only by gouging out of the dielectric.

For an understanding of the invention principles, reference is made to the following description of typical embodiments thereof as illustrated in the accompanying drawing.

Figures 10, 11, 12, 13, 14, 15, 16:
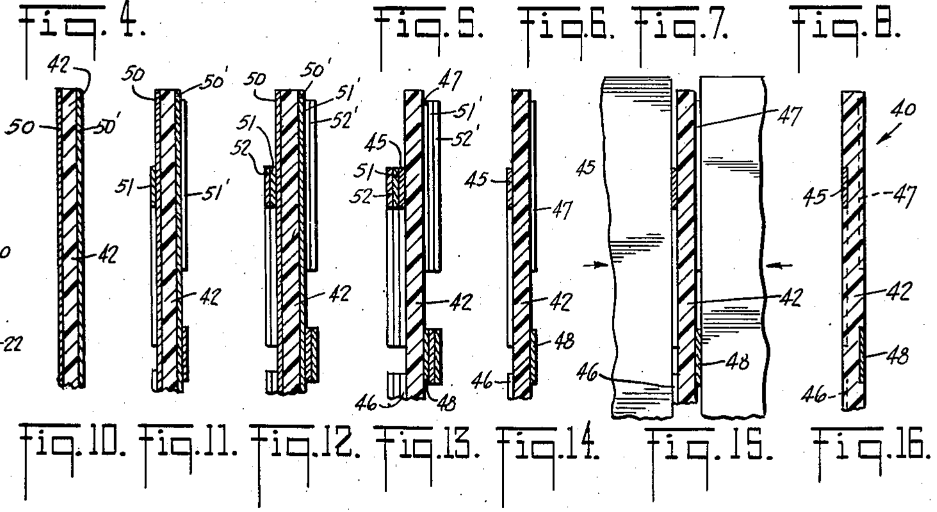

Figs. 10 through 15 are views, similar to Figs. 5 through 8, illustrating the formation of printed circuits on both surfaces of a dielectric panel; and Fig. 16 is a sectional view of the completed panel of Figs. 10 through 15.

Referring to Figs. 1 through 8, the invention is illustrated as applied to produce a circuit panel 20 having metal foil conductors such as 25 and 26 thereon. Panel 20 is a circuit panel of the type customarily used in automatic business machines, for example, the several conductors 25 and 26 being suitably connected to operating and/or energizing circuits of the machine.

It will be noted that the several conductors 25 have their inner ends 25*a* extending in radial relation to a circular aperture 21 in the dielectric base panel 22 on which the conductors are mounted. Correspondingly, the inner end 26*a* of conductor 26 is arranged as a substantial semi-circle concentric with aperture 21. It will be noted that a circular marginal portion 23 of dielectric panel 22 lies between the inner ends of the conductors and aperture 21.

A rotatable or oscillatable circuit closure or contact member is arranged to engage in aperture 21 and have operative association with conductors 25 and 26, such member forming no part of the present invention and being a standard element of an automatic business machine. It will be understood that circuit panel 20 is merely exemplary of a circuit panel produced according to the present invention, and the particular panel configuration, number of conductors, etc., is in no way a limitation of the invention principles.

Figures 1, 2, 3:
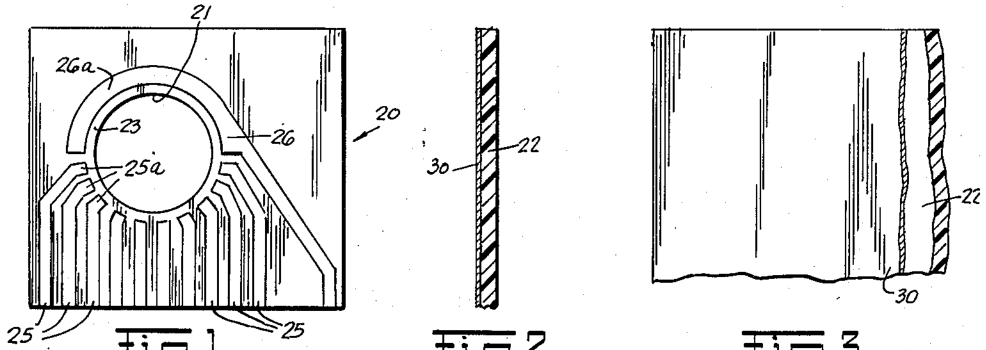
Fig. 1 is an elevation view of a completed circuit panel processed in accordance with the invention.
Fig. 2 and Fig. 3 are sectional and elevation views, respectively, of the dielectric base panel with the conductive foil applied thereto.

Figs. 2 through 8 illustrate steps in forming panel 20 according to the present invention. Referring to Figs. 1 and 2, in the first step of the method as applied to circuit panel 20, a thin sheet of metal foil 30, such as copper foil, for example, is applied to cover one surface of dielectric base panel 22. Foil 30 which may, for example, be 0.005'' thick or less, is applied to panel 22 under heavy pressure, or a combination of pressure and adhesive may be used.

In accordance with the present invention, panel 22 is a sheet of partially or semi-cured synthetic resin, so that it is pliable and deformable. The panel 22 remains in the semi-cured condition during the printing, etching and ink removing operations.

Figures 4, 5, 6, 7, 8:
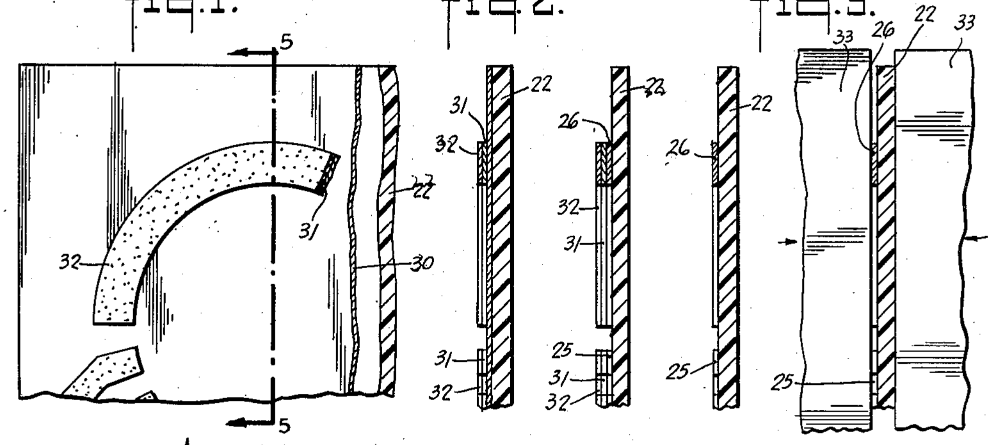
Fig. 4 is an elevation view of the panel after printing and the application of etch resist powder to the printing.
Figs. 5 through 8 are sectional views, on the line 5—5 of Fig. 4, illustrating the successive steps of the invention method.

As shown in Figs. 4 and 5, the desired circuit design is then imprinted on foil 30 by a suitable adherent ink as at 31. While the ink is still wet or tacky, the foil covered surface is coated with an acid or etch resist powder as at 32, the powder adhering to the inked portions forming the design and being removed from the non-printed portions of the foil. The foil coated and printed panel is then etched, to remove the non-printed portions of foil 30, as shown in Fig. 6. This leaves the printed and etch resist powder coated portions of the foil forming conductors 25 and 26. Instead of using ink and powder in combination, an acid resistant adherent ink may be used alone.

Figure 9:
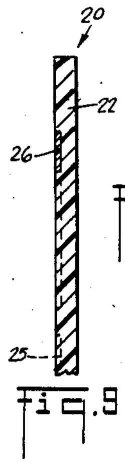
Fig. 9 is a sectional view of the completed panel.

The ink 31, or the ink and powder 32, are then removed by washing, grinding or the like, leaving panel 22 with overlying cleaned conductors 25, 26 as seen in Fig. 7. Heat and pressure are then applied to the printed, semi-cured panel, as schematically indicated in Fig. 8 by the movable heated pressure blocks 33. This forces or imbeds conductors 25, 26 into flush relation with the surface of panel 22 and, at the same time, the panel is cured and hardened. The panel now appears in section as shown in Fig. 9.

The application of the invention to the formation of a circuit panel 40 having circuits printed on both surfaces is shown in Figs. 10 through 16. In forming panel 40, sheets 50 and 50' of copper foil, for example, are applied to opposite surfaces of the semi-cured dielectric base panel 42 by pressure or by pressure and adhesive, as shown in Fig. 10. The designs are then printed on both foil sheets, as indicated at 51, 51', and the sheets coated with resist powder adhering to the inked designs as at 52, 52' (Figs. 11 and 12). The panel is then etched to remove the non-printed and non-coated portions of foils 50, 50', leaving conductors 45, 46, 47 and 48 coated with the ink and the resist powder. The panel now appears in section as shown in Fig. 13.

The ink and powder, or only the etch resistant ink if the powder is not used, are then removed from the conductor surfaces in any suitable manner. Heat and pressure are then applied to the semi-cured and printed panel, as schematically indicated in Fig. 15 by the movable heated pressure plates 53, 53. This imbeds the conductors into flush relation with the dielectric surfaces and simultaneously hardens and cures panel 40.

The invention provides a circuit panel which has one or more flush surfaces with conductors imprinted thereon. The flush relation of the conductive and dielectric surfaces decreases contact resistance and increases the panel life. Additionally, the panel is much less expensive than those produced by prior art methods.

In an illustrative embodiment of the process of this invention, wherein the semi-cured panel is $\frac{1}{16}$'' thick and the foil mounted on the surface for printing and etching is .003'' thick, an optimum imbedding effect is developed under the following conditions of temperature and pressure: the semi-cured panel carrying the adhered etched metal foil circuit arrangement is initially subjected in a hydraulic or like press to heat of 300° F. and pressure of one thousand (1000) pounds per square inch for a period of approximately five minutes; thereafter the thus treated foil imbedded panel is subjected to heat at the same above temperature for a further period of approximately twenty-five minutes.

Although in the embodiment illustrated in the drawing, the foil may be mounted on one or both faces of a semi-cured panel for imbedding in accordance with the process of the invention; it is within the province of this invention to provide as a base or support for the metallic foil circuit a laminating panel incorporating semi-cured and cured lamina, the foil being imbedded in the semi-cured panel prior to or after lamination of the semi-cured and cured laminae.

While specific embodiments of the invention have been shown and described in detail to illustrate the application of the invention principles, it should be understood that the invention may be otherwise embodied without departing from such principles.

What is claimed is:

1. The method of forming an electric circuit carrying panel which comprises applying conductive sheet material to at least one surface of a semi-cured deformable panel of thermo-setting dielectric material, removing portions of said sheet material to form a predetermined circuit pattern including individual conductors, imbedding the circuit components into flush relation with the dielectric surface, and hardening and curing the panel.

2. The method of forming an electric circuit carrying panel which comprises applying conductive sheet material to at least one surface of a semi-cured deformable panel of thermo-setting dielectric material, removing portions of said sheet material to form a predetermined circuit pattern including individual conductors, and applying heat and pressure to the conductor carrying surface of the panel to imbed the circuit components into flush relation with the dielectric surface and harden and cure the panel.

3. The method of forming an electric circuit carrying panel which comprises applying conductive sheet material to at least one surface of a semi-cured deformable panel of thermo-setting dielectric material, removing portions of said sheet material to form a predetermined circuit pattern including individual conductors, and applying heat and pressure to the conductor carrying surface and the opposite surface of the panel to imbed the circuit components into flush relation with the dielectric surface and harden and cure the panel.

4. The method of forming an electric circuit carrying panel which comprises applying conductive metal foil to at least one surface of a semi-cured deformable panel of thermo-setting dielectric material, removing portions of said foil to form a predetermined circuit pattern including individual conductors, imbedding the circuit components into flush relation with the dielectric surface, and hardening and curing the panel.

5. The method of forming an electric circuit carrying panel which comprises applying conductive metal foil to at least one surface of a semi-cured deformable panel of thermo-setting dielectric material, applying etch resistant material to said foil in a predetermined circuit pattern, etching the uncoated foil portions to form such predetermined circuit pattern, removing the etch resistant material from the circuit pattern, imbedding the circuit components into flush relation with the dielectric surface, and hardening and curing the panel.

6. The method of forming an electric circuit carrying panel which comprises applying conductive metal foil to at least one surface of a semi-cured deformable panel of thermo-setting dielectric material, applying etch resistant material to said foil in a predetermined circuit pattern, etching the uncoated foil portions to form such predetermined circuit pattern, removing the etch resistant material from the circuit pattern, and applying heat and pressure to the pattern carrying surface of the panel to imbed the circuit pattern into flush relation with the dielectric surface and harden and cure the panel.

7. The method of forming an electric circuit carrying panel which comprises applying a sheet of conductive metal foil to each of the opposed surfaces of a semi-cured deformable panel of thermo-setting dielectric material, removing portions of said foil sheets to form predetermined circuit patterns, imbedding the circuit patterns into flush relation with the dielectric surfaces, and hardening and curing the panel.

8. The method of forming an electric circuit carrying panel which comprises applying a sheet of conductive metal foil to each of the opposed surfaces of a semi-cured deformable panel of thermo-setting dielectric material, removing portions of said foil sheets to form predetermined circuit patterns, and applying heat and pressure to such opposed surfaces to imbed the circuit patterns into flush relation with the dielectric surfaces and harden and cure the panel.

9. The method of forming an electric circuit carrying panel which comprises applying a sheet of conductive metal foil to each of the opposed surfaces of a semi-cured deformable panel of thermo-setting dielectric material, applying etch resistant material to each of said sheets in predetermined circuit patterns, etching the uncoated foil portions to form such predetermined circuit patterns, removing the etch resistant material from the circuit patterns, imbedding the circuit patterns into flush relation with the dielectric surfaces and hardening and curing the panel.

10. The method of forming an electric circuit carrying panel which comprises applying a sheet of conductive metal foil to each of the opposed surfaces of a semi-cured deformable panel of thermo-setting dielectric material, applying etch resistant material to each of said sheets in predetermined circuit patterns, etching the uncoated foil portions to form such predetermined circuit patterns, removing the etch resistant material from the circuit patterns, and applying heat and pressure to such opposed surfaces to imbed the circuit patterns into flush relation with the dielectric surfaces and harden and cure the panel.

11. The method of forming an electric circuit carrying panel which comprises applying conductive metal foil to at least one surface of a semi-cured deformable panel of thermo-setting dielectric material, applying etch resistant material to said foil in a predetermined circuit pattern, etching the uncoated foil portions to form such predetermined circuit pattern, removing the etch resistant material from the circuit pattern, initially applying heat and pressure to the pattern carrying surface of the panel for a short period to imbed the circuit pattern into flush relation with the dielectric surface and thereafter applying heat alone to harden and cure the panel.

EDWARD ADLER.
ANTHONY CHIESA.

REFERENCES CITED

The following references are of record in the file of this patent:

UNITED STATES PATENTS

| Number | Name | Date |
|---|---|---|
| 2,069,393 | Sloan | Feb. 2, 1937 |
| 2,401,472 | Franklin | June 4, 1946 |
| 2,441,960 | Eisler | May 25, 1948 |
| 2,447,541 | Sabee et al. | Aug. 24, 1948 |
| 2,602,731 | Nierenberg | July 8, 1952 |